March 15, 1932.  S. RUBEN  1,849,436
ELECTROLYTIC CELL
Filed April 29, 1926
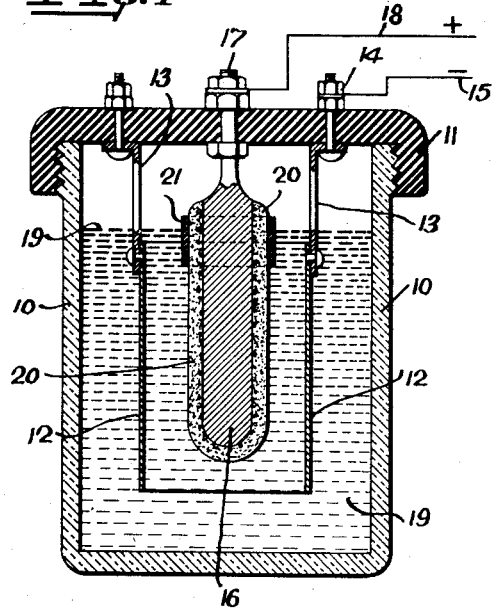
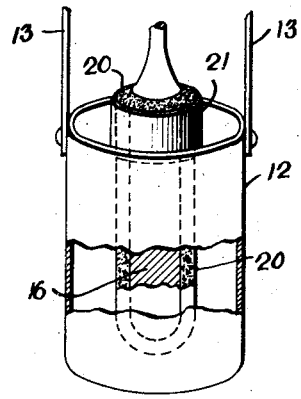
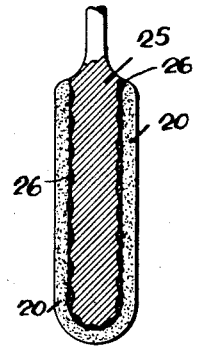
INVENTOR.
Samuel Ruben
BY
Mayer Warfield Watson
ATTORNEYS.

Patented Mar. 15, 1932

1,849,436

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTROLYTIC CELL

Application filed April 29, 1926. Serial No. 105,403.

This invention relates to electrolytic cells, and particularly to electrolytic cells of the so-called "aluminum" variety which have asymmetric conductivity.

The object of the invention is generally to provide an improved cell of the aluminum variety which is efficient, economical and readily manufactured.

More specifically an object is to provide an asymmetric electrolytic cell in which an improved construction of the aluminum electrode is provided whereby long life and improved operating characteristics result.

Other objects of the invention will in part be obvious and will in part appear hereinafter.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention, reference should be had to the following detailed description taken in connection with the accompanying drawings, in which:

Figure 1 is a vertical sectional view showing a cell-jar containing electrolyte and electrode elements constructed in accordance with the invention;

Fig. 2 is a view, partly in section and partly in perspective, showing details of the electrode elements; and Fig. 3 is a sectional view showing a modified form of electropositive electrode.

Referring now to the drawings, and particularly to Figs. 1 and 2, 10 denotes a cell-jar of glass or other suitable material having a cover 11 adapted to close the jar tightly, the cover being of insulating material and serving as the support for the electrode elements. The electronegative electrode element is shown at 12 and comprises an open-ended cylinder of suitable electronegative material, for example, iron silicate, which is supported from the cover by means of the conducting straps 13. One of these straps, namely, that shown at 14, is arranged to serve as the negative terminal for the electrolytic cell, and from it leads a conductor shown at 15. The electropositive electrode element is shown at 16, disposed concentrically within the electronegative electrode 12; this electrode being likewise supported from the cover 11 and extending therethrough to provide a positive terminal 17 from which leads a conductor 18.

The electrolyte is shown at 19. Any suitable electrolyte may be employed which is adapted to react upon the electropositive electrode to form electrochemically thereon a current-blocking film. The preferable electrolytes, as is well known, are solution of salts having relatively complex molecules; for example, ammonium borate, ammonium phosphate, etc., where the electropositive electrode element is of aluminum.

In asymmetric electrolytic cells where aluminum comprises the electropositive electrode element, the cell functions because of the current-blocking film formed of superposed layers of oxygen-gas and colloidal aluminum hydroxide surrounding the electropositive electrode. The maximum potential which this variety of cell can withstand is dependent upon the thickness of both these layers. It is known, however, that the so-called aluminum cell has critical characteristics, depending upon the temperature and the leakage current, the latter being a function of the operating temperature. It would appear that the leakage current is mainly due to the more rapid and complete diffusion of these layers into the electrolytes when at the higher temperatures. The life of the aluminum cell is relatively short, depending upon the original current density and upon the temperature of the electrolyte.

It has been ascertained that there exists a relation between the life of the cell and the concentration of the aluminum hydrate in the electrolyte and that when hydrate concentration reaches a certain density, then a partial coagulation occurs forming a layer of crystalline mass. The cell failure is apparently due at least in part to the effect of these large masses penetrating the film and reacting directly upon the active surface of the aluminum electrode. As confirmation of this, it has been observed that the phenomenon of break-down in the aluminum cell is accompanied by relatively small but distinct glowing spots over the surface of the active area of the aluminum electrode; the spots appearing with the passage of time. This phenomenon of glowing is precisely similar to that which can be induced should a suspended solid conducting particle be placed in the electrolyte and forced to penetrate the gaseous and hydroxide layer formed about the aluminum electrode. Such a particle, it will be seen, operates to short circuit the gaseous and hydroxide layer, the particle affording a direct path for the current from the electrolyte to the electrode. Once such a path has been started, the increase in the temperature of the electrolyte is due directly to the passage of the leakage current along the surface of the suspended gaseous and hydroxide layers, and induces an increased diffusion of the electrolyte into the layers about the electropositive electrode, whence there results a reduction in the dielectric value of the layers functioning as a current-blocking film about the electropositive electrode. This increase in the conductivity of the current-blocking film would of course be accompanied by a rapid rise in the temperature of the electrolyte, and dissipation of its asymmetric conductivity.

In the practice of the present invention, provision is made to avoid this penetration of the gaseous and hydroxide layers about the electropositive electrode by the concentration of coagulated colloidal particles in the electrolyte adjacent the layers. This is accomplished by enveloping substantially the whole of the active surface of the electropositive electrode element with a relatively porous envelope that is disposed in intimate contact with the electrode surface, so that no particles or matter may intervene at any point between the porous envelope and the active surface of the electrode.

In the drawings this porous envelope is indicated at 20 and may comprise a porous clay cup or other vessel such as is commonly used in certain types of primary cells; the electropositive electrode being made to fit snugly within the same. This latter is conveniently accomplished by casting the aluminum within the porous cup. Since this cup or envelope is porous, it is seen that gaseous and liquid particles may readily pass through the walls of the envelope and react with the surface of the electropositive electrode. The pores of this envelope, however, are so small that coagulated colloidal or crystal particles cannot enter.

This porous envelope should be sufficiently thick that both the gaseous and hydroxide layers may form about the electropositive electrode within the porous walls of the envelope. It is thus seen that by this provision the insulating layers which thus form over the active surface of the electropositive electrode are completely protected from penetration by particles in any form which may disrupt the current-blocking film in the electrolyte. As a result, the life of the electrolytic cell produced in accordance with the present invention is not dependent upon the temperature characteristic which heretofore has been the limiting factor controlling the break-down period in this type of cell. The active life is thus increased many times over that heretofore generally experienced.

There is shown in the drawings at 21 a band of rubber or other suitable insulating material disposed about the top of the porous cup. This is disposed at a height such that a substantial portion projects both above and below the liquid level of the electrolyte within the jar 10. By this means the liquid electrolyte is prevented from being lifted by capillarity over the top of the porous cup and penetrating between the same and the electropositive electrode from the top.

Other metals than aluminum are known to have the film-forming characteristic, which if produced by electrochemical reaction between such an element and a suitable film-forming electrolyte when subject to the proper difference of potential, will have asymmetric conductivity. Such metals as tungsten, tantalum, neodymium and magnesium have this property, but exhibit it in a somewhat transitory manner and have been heretofore subject to relatively short lives when used as an electropositive element in asymmetric cells.

By the present invention the principal factor in the break-down of electrolytic cells is removed. Consequently these elements are adapted for use as materials for the electropositive electrode element in asymmetric electrolytic cells constructed in accordance with the invention. Such elements as tungsten, for example, are not as readily cast in porous cups as aluminum; consequently it is preferable to use these elements in the powdered form. In such case the porous cup is rammed tightly with powder and a suitable conducting electrode having a terminal connection is introduced into the mass.

Tungsten, however, may be introduced in a porous cup in a more convenient manner than by ramming the same in powdered form into the porous cup. An arrangement adapted to this end is shown in Fig. 3. Here a metallic core comprising a body of tungsten 25 is disposed within the porous cup 20 and a filling of aluminum 26 disposed in the manner of cement between the tungsten and the inner wall of the porous cup. This may be accomplished in any convenient manner known to the arts. A relatively thin coating of aluminum, however, is preferable, since it is the film-forming properties of the tungsten that are here desired. A relatively thin layer of aluminum disposed in this manner over tungsten would of itself seem to be partially permeable, as the composite electrode thus produced has tungsten characteristics to a certain degree.

The asymmetric cell of this invention is adapted for the same variety of uses as in asymmetric electrolytic cells known to the prior art, but by reason of its longer-life characteristic and relatively more uniform asymmetric conductivity is more reliable and is more satisfactory than the cells heretofore known. The uses for which it is adapted are, for example, an electrolytic condenser, a lightning arrester, an inverse direct current cut-out, an alternating current rectifier, etc.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In electrolytic cells having asymmetric conductivity, the combination with an electronegative electrode element and a film-forming electrolyte, of an electropositive electrode element cooperatively disposed in conjunction therewith; said electropositive electrode element being of a metal having film-forming characteristics when reacting electrochemically with said electrolyte and provided initially with a relatively porous envelope constructed to have a substantial thickness and disposed in intimate contact with and substantially enveloping the whole of its active surface.

2. In electrolytic cells having asymmetric conductivity, the combination with an electronegative electrode element and a film-forming electrolyte, of an electropositive electrode element cooperatively disposed in conjunction therewith; said electropositive electrode element being of a metal having film-forming characteristics when reacting electrochemically with said electrolyte and provided with a relatively porous envelope disposed in intimate contact with and substantially enveloping the whole of its active surface, said envelope being of greater thickness than the normally active current-blocking film.

3. In electrolytic cells having asymmetric conductivity, the combination with an electronegative electrode element and a film-forming electrolyte, of an electropositive electrode element cooperatively disposed in conjunction therewith; said electropositive electrode element being of aluminum and adapted to have a current-blocking film formed electrochemically upon its surface when immersed in said electrolyte and provided with a relatively porous vessel disposed in intimate contact with substantially the whole of said active surface, said porous vessel having a thickness greater than that of the normally active current-blocking film.

4. In electrolytic cells having asymmetric conductivity, the combination with an electronegative electrode element and a film-forming electrolyte, of an electropositive electrode element cooperatively disposed in conjunction therewith; said electropositive electrode element being of aluminum and adapted to have formed electrochemically on its active surface when immersed in said electrolyte a current-blocking film and having a porous cup disposed about the same and in intimate contact with substantially the whole of said active surface, said porous cup being of greater thickness than said current-blocking film.

5. In electrolytic cells having asymmetric conductivity, the combination with an electronegative electrode element and a film-forming electrolyte, of an electropositive electrode element cooperatively disposed in conjunction therewith; said electropositive electrode element having an aluminum surface and adapted to have formed electrochemically upon its surface when immersed in said electrolyte a current-blocking film and having a relatively thick porous cup disposed about the same in intimate contact with substantially the whole of said active surface, and means associated therewith adapted to prevent said eletcrolyte from being drawn by capillarity into contact with the juncture between said cup and said electrode.

In testimony whereof I affix my signature.

SAMUEL RUBEN.